(12) United States Patent
Lee et al.

(10) Patent No.: US 9,415,631 B2
(45) Date of Patent: Aug. 16, 2016

(54) VARIABLE DIAMETER WHEEL

(71) Applicant: SNU R&DB Foundation, Seoul (KR)

(72) Inventors: Dae Young Lee, Ansan-si (KR); Ji Suk Kim, Seoul (KR); Sa Reum Kim, Seongnam-si (KR); Jae Jun Park, Hanam-si (KR); Kyu Jin Cho, Seoul (KR)

(73) Assignee: SNU R&DB Foundation, Seoul (KR)

( * ) Notice: Subject to any disclaimer, the term of this patent is extended or adjusted under 35 U.S.C. 154(b) by 8 days.

(21) Appl. No.: 14/570,166

(22) Filed: Dec. 15, 2014

(65) Prior Publication Data

US 2015/0352896 A1    Dec. 10, 2015

(30) Foreign Application Priority Data

Dec. 17, 2013   (KR) .......................... 10-2013-0157355

(51) Int. Cl.
*B60B 19/04*   (2006.01)
*B60B 15/02*   (2006.01)

(52) U.S. Cl.
CPC ............... *B60B 19/04* (2013.01); *B60B 15/025* (2013.01); *B60B 2900/351* (2013.01); *B60Y 2200/20* (2013.01); *B60Y 2400/40* (2013.01)

(58) Field of Classification Search
CPC .............. B60B 19/04; B60B 2900/351; B60B 2900/551; B60B 2900/90; B60B 2900/911; B60B 15/025; B60Y 2200/20; B60Y 2200/40
USPC ......................................... 301/91, 92, 93, 94
See application file for complete search history.

(56) References Cited

U.S. PATENT DOCUMENTS

| 7,060,092 B2 | 6/2006 | Kuribayashi et al. |
| 8,011,736 B2 * | 9/2011 | Tan ........................... B60B 1/06 301/31 |
| 8,678,520 B2 * | 3/2014 | Sheu ...................... B60B 19/04 301/32 |
| 2015/0084398 A1 * | 3/2015 | Lee ........................ B60B 1/003 301/66 |

FOREIGN PATENT DOCUMENTS

| JP | 8182868 A | 7/1996 |
| WO | 2008065407 A1 | 6/2008 |

OTHER PUBLICATIONS

Kim et al., "Multi-Material Planar Fabrication Method of Origami Structures for Robotics", May 30, 2013, pp. 1-3, Seoul National University, South Korea.
Lee et al., "The Deformable Wheel Robot using Magic-Ball Origami Structure", Proceedings of the ASME 2013 International Design Engineering Technical Conferences & Computers and Information in Engineering Conference, Aug. 4-7, 2013, pp. 1-9, Portland, Oregon, USA.

(Continued)

*Primary Examiner* — John Walters
(74) *Attorney, Agent, or Firm* — The Webb Law Firm (57) ABSTRACT

Disclosed is a variable-diameter wheel including a wheel having a folding pattern in which a unit cell is repeated and configured to be expanded or contracted so that a wheel diameter is varied; a spoke fixedly coupled to both longitudinal ends of the wheel and configured to be expanded or contracted according to a change in a distance between both sides, such that the wheel diameter is varied; and a variable induction shaft rotatably coupled with one of the both spokes to move the spoke in at least one lengthwise direction and configured to vary a distance between one spoke and the other spoke.

11 Claims, 9 Drawing Sheets

(56) References Cited

OTHER PUBLICATIONS

Lee et al., "Fabrication of Origami Structure using Pattern Enclosed Composite(PEC)", 2013 13th International Conference on Control, Automation and Systems, Oct. 20-23, 2013, Kimdaejung Convention Center, Gwangji, Korea.

Lee et al., "Design of Deformable-Wheeled Robot Based on Origami Structure with Shape Memory Alloy Coil Spring", 2013 10th International Conference on Ubiquitous Robots and Ambient Intelligence, Oct. 30, 2013-Nov. 2, 2013, Jeju, South Korea.

Kim et al., "Origami Design of Bistable Structure and Driving Mechanism by Using Origami", 2013, South Korea.

Lee et al. "Fabrication of Origami Wheel using Pattern Embedded Fabric and its Application to a Deformable Mobile Robot", 2014 IEEE International Conference on Robotics & Automation, May 31-Jun. 7, 2014, p. 2565, Hong Kong Convention and Exhibition Center, Hong Kong, China.

Lee et al., "Characteristic Verification and modification of Origami based Deformable Wheel", Jun. 19-Jun. 21, 2014, pp. 1-2, Seoul National University, South Korea.

Lee et al., "Design of Compliant Origami Structure for Deformable Wheel Mechanism", International Symposium on Green Manufacturing and Applications, 2014, Korea.

* cited by examiner

VARIABLE DIAMETER WHEEL

CROSS-REFERENCE TO RELATED APPLICATION

This application claims priority to Korean Patent Application No. 2013-0157355 filed Dec. 17, 2013, the disclosure of which is hereby incorporated in its entirety by reference.

BACKGROUND

1. Field of the Invention

The present invention relates to a variable-diameter wheel, and more particularly, to a variable-diameter wheel of which a diameter is variable while the wheel is folded or unfolded along a folding pattern.

2. Discussion of Related Art

A variable-diameter wheel of which a diameter is variable may be used in a vehicle which is driven on an uneven and rough road or a robot which performs special purposes such as an explosive detection and a scouting operation.

Generally, in the case of a vehicle wheel, when an obstacle is higher than a wheel shaft, the wheel may be caught by the obstacle and may not pass the obstacle. However, in the case of a vehicle (including a robot) having the variable-diameter wheel, a diameter of the wheel may be increased in this situation, such that the wheel shaft becomes higher than the obstacle, and thus the wheel may go over the obstacle.

The variable-diameter wheel is particularly useful for vehicles or robots having the special purposes such as the explosive detection and the scouting operation. This is because such vehicles or robots should be moved at a place in which obstacles such rocks and stairs are present on a ground surface, as well as a place in which the obstacles are placed at an upper side spaced from the ground, such as a gap between the ground and an upper structure.

When the obstacles are placed on the ground, the diameter of the wheel is increased to go over the obstacles. When the obstacles are placed at the upper side spaced from the ground, the diameter of the wheel is reduced to lower a height of the vehicle or the robot, such that the vehicle or the robot passes the obstacles.

In an example of a well-known variable-diameter wheel, the variable-diameter wheel includes one hub having a predetermined diameter and an expanding piece which is movable in a radial direction of the hub, and has a mechanical mechanism in which a diameter of the wheel is changed according to radial movement of the expanding piece.

However, in the case of the vehicles or robots having the special purposes such as the explosive detection and the scouting operation, considering that a size thereof is gradually reduced to be movable through a narrow space, and a weight thereof is also reduced to increase an operation time on a single charge, a new structure of the variable-diameter wheel in which a diameter thereof is variable with a simple structure, while a weight thereof is reduced, is required.

Meanwhile, a stent using an origami pattern is known as a medical stent. The well-known stent is formed of a tube body having a pattern, so-called "waterbomb pattern", in which a unit cell is repeated. The tube body may be folded or unfolded along the pattern, and thus a diameter thereof may be variable.

PRIOR ART DOCUMENTS

Patent Documents (Patent document 1) U.S. Pat. No. 7,060,092 (registered on Jun. 26, 2006)

SUMMARY OF THE INVENTION

The present invention is directed to a variable-diameter wheel of which diameter is variable.

According to an aspect of the present invention, there is provided a variable-diameter wheel including a wheel having a folding pattern in which a unit cell is repeated and configured to be expanded or contracted so that a wheel diameter is varied; a spoke fixedly coupled to both longitudinal ends of the wheel and configured to be expanded or contracted according to a change in a distance between both sides, such that the wheel diameter is varied; and a variable induction shaft rotatably coupled with one of the both spokes to move the spoke in at least one lengthwise direction and configured to vary a distance between one spoke and the other spoke.

According to the present invention, the unit cell of the wheel may include one pair of longitudinal edge folding parts configured to extend in a lengthwise direction of the wheel, one pair of cross edge folding parts configured to extend in a circumferential direction of the wheel, a longitudinal middle edge folding part configured to extend in the lengthwise direction at a middle portion between the longitudinal edge folding parts, and an inclined edge folding part configured to extend at each intersecting point of the longitudinal edge folding parts and the cross edge folding parts to be inclined and to intersect with the longitudinal middle edge folding part.

According to the present invention, the wheel may include a wheel body having the folding pattern in which the unit cell is repeated, and a spoke connection part formed at both longitudinal ends of the wheel body and in which a unit cell for spoke connection is repeated so as to form a predetermined-sized spoke coupling hole at the both longitudinal ends of the wheel body.

According to the present invention, the unit cell for spoke connection may include a first connection cell in which a longitudinal peripheral edge folding part configured to extend in parallel with the longitudinal edge folding part of the unit cell located at the both ends of the wheel body forms one side thereof, and a peripheral inclined edge folding part configured to extend from an end of the longitudinal peripheral edge folding part to an intersecting point of the longitudinal middle edge folding part and the cross edge folding part of the unit cell is provided, and a second connection cell formed to be connected with at least one peripheral inclined edge folding part of both first connection cells, such that the both first connection cells are connected with each other via an equilateral triangular cell.

According to the present invention, the variable induction shaft may include a sliding shaft coupled with one of the both spokes to be rotatable and to control movement of the one spoke in at least one lengthwise direction, a sliding shaft actuator configured to provide a longitudinal movement force of the sliding shaft, and a rotating shaft restrictively coupled with the other spoke to rotate the other spoke.

According to the present invention, the variable induction shaft may further include a fixing shaft having a hollow in which the sliding shaft is coupled to rotatable therein and which guides longitudinal movement of the sliding shaft, and of which the other end is fixed to a body of a robot or a vehicle, and the sliding shaft extends through the hollow of the fixing shaft so that one end thereof is coupled to the one spoke, and the rotating shaft has a hollow in which the fixing shaft is inserted, and the rotating shaft is coupled so as to be rotatable with respect to the fixing shaft, and a power transmitting part configured to receive a rotating force provided from a power source of the robot or the vehicle is provided at the other end of the rotating shaft.

According to the present invention, the sliding shaft may extend to pass through a shaft hole of the one spoke, and a flange at least partly expanded in a radial direction is provided at an end of the sliding shaft located at an outer side of the shaft hole.

According to the present invention, the variable-diameter wheel may further include a sliding shaft cover configured to cover the flange of the sliding shaft located at an outer side of the one spoke, and coupled with the one spoke.

According to the present invention, the sliding shaft actuator may include a driving motor installed at a body of the vehicle or the robot, and a wire wound on or unwound from the driving motor and of which an end is fixed to the sliding shaft.

According to the present invention, an elastic member configured to provide an elastic force in a direction in which the wheel is contracted is installed in the wheel.

According to the present invention, the wheel may be made from a sheet including a folding area configured to form edge folding parts which are foldable and a rigid area surrounded by the folding area. The wheel is separated and developed to be the sheet. The sheet may include first and second flexible sheets formed of a flexible material, and a rigid material disposed at a position of the rigid area between the first and second flexible sheets. The folding area is formed by bonding the first and second flexible sheets without the rigid material interposed therebetween, and the rigid area is formed by bonding the first and second flexible sheets with the rigid material at least partly interposed therebetween.

According to the present invention, a through-hole is formed at an intersecting point of the edge folding parts, and a reinforcing member is coupled in the through-hole.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIG. 7 is a view for describing a method of manufacturing the wheel according to present invention, wherein FIG. 7A is an exploded view, FIG. 7B is coupled view, FIG. 7C is a coupled cross-sectional view, and FIG. 7D is a view illustrating a modified example;

DETAILED DESCRIPTION OF EXEMPLARY EMBODIMENTS

Hereinafter, a variable-diameter wheel according to an embodiment of the present invention will be described in detail with reference to the accompanying drawings.

Figure 1:
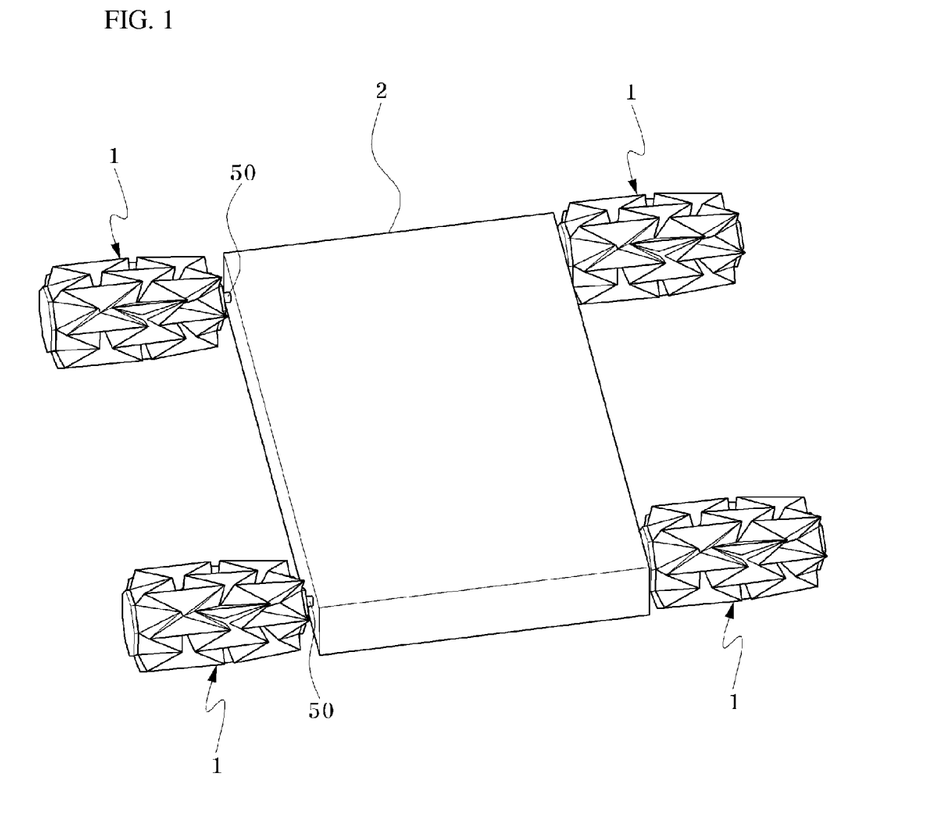
FIG. 1 is a view illustrating a moving body having a variable-diameter wheel according to the present invention.
Figure 2:
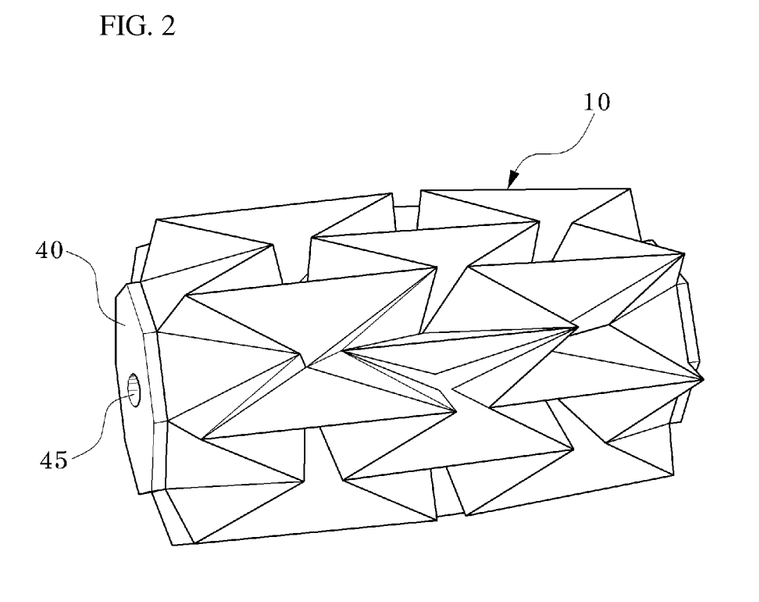
FIG. 2 is a view illustrating a state in which a wheel diameter is reduced in the variable-diameter wheel according to the present invention.
Figure 3:
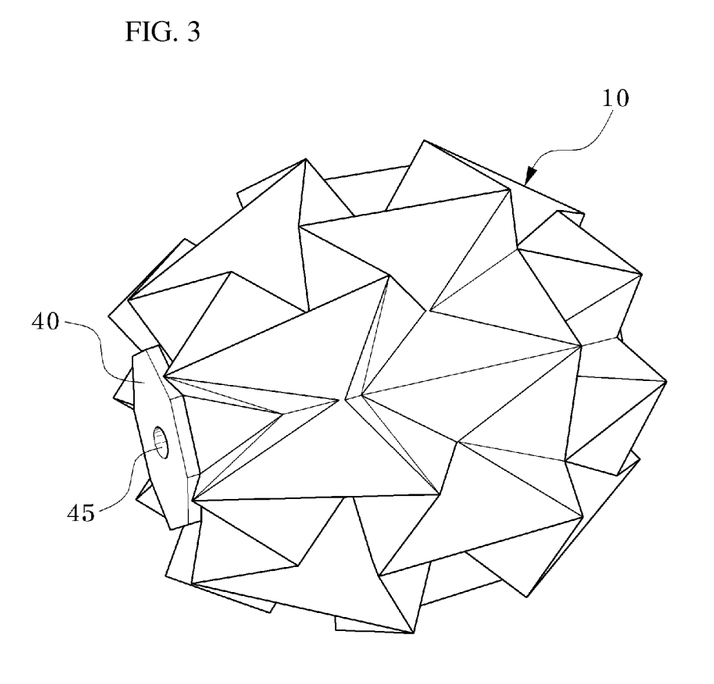
FIG. 3 is a view illustrating a state in which the wheel diameter is increased in the variable-diameter wheel according to the present invention.
Figure 4:
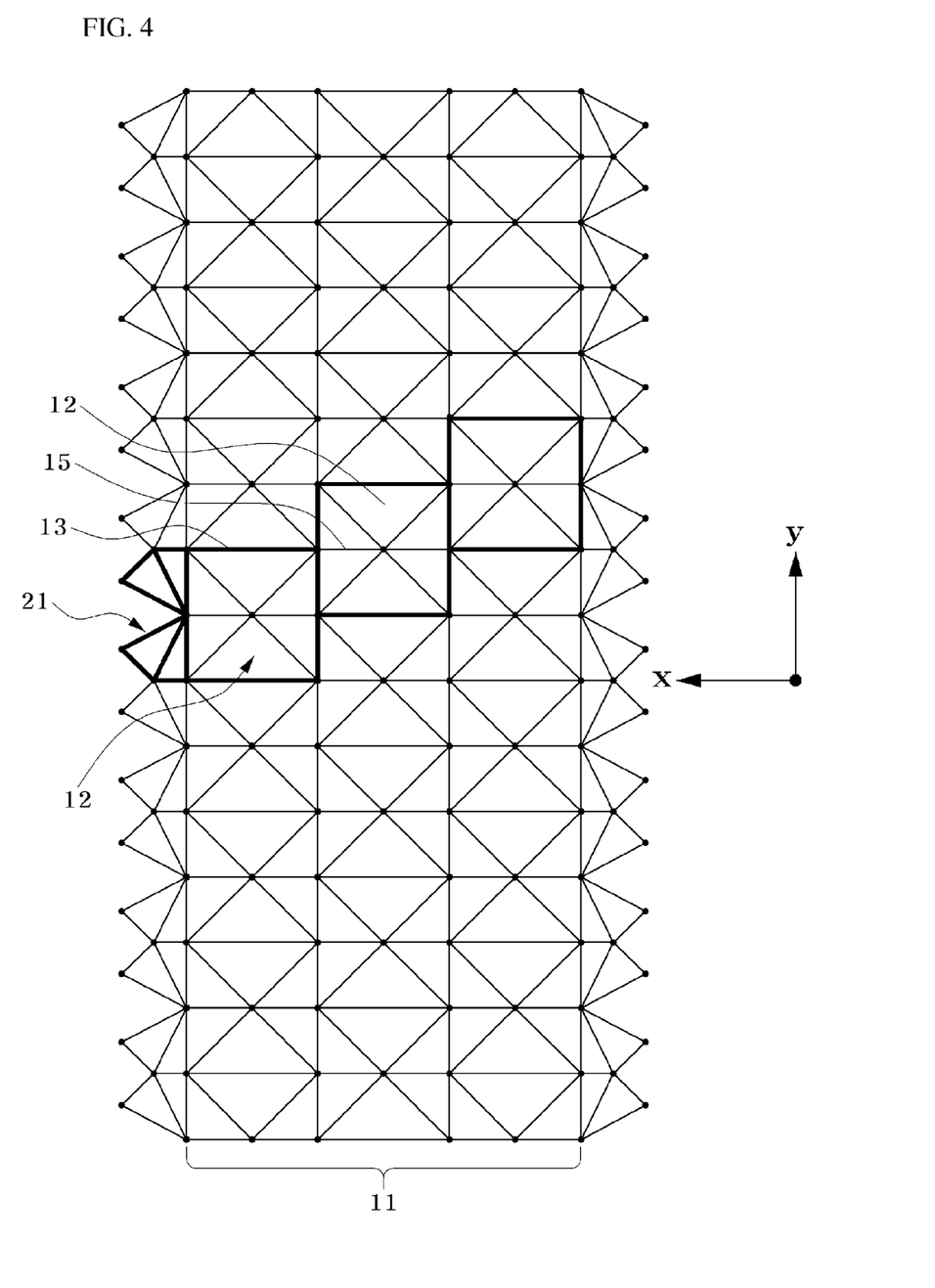
FIG. 4 is a development view illustrating a state in which a wheel is separated from the variable-diameter wheel according to the present invention and then developed.
Figure 5:
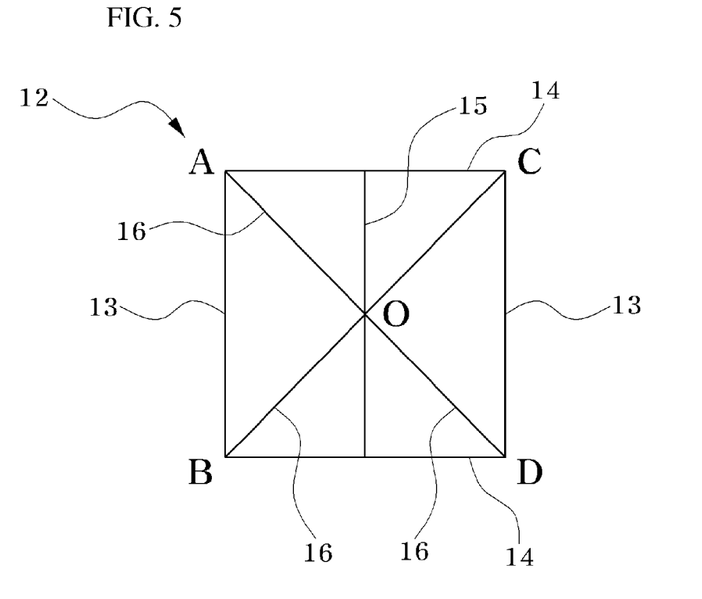
FIG. 5 is a view for describing a unit cell forming a wheel body in FIG. 4.
Figure 6:
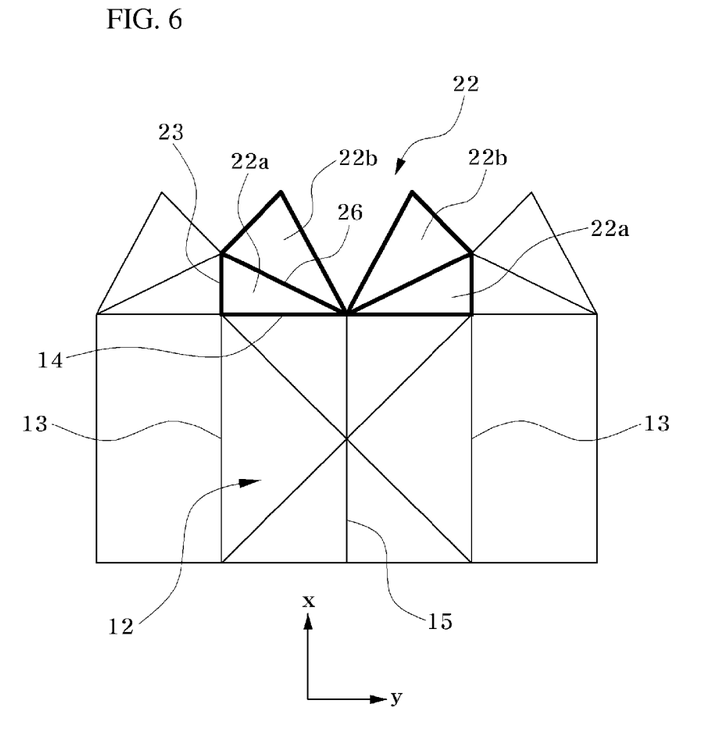
FIG. 6 is a view for describing the unit cell for spoke connection forming a spoke connection part in FIG. 4.

FIG. 1 is a view illustrating a robot having a variable-diameter wheel according to the present invention, FIG. 2 is a view illustrating a state in which a wheel diameter is reduced in the variable-diameter wheel according to the present invention, FIG. 3 is a view illustrating a state in which the wheel diameter is increased in the variable-diameter wheel according to the present invention, FIG. 4 is a development view illustrating a state in which a wheel is separated from the variable-diameter wheel according to the present invention and then developed, FIG. 5 is a view for describing a unit cell forming a wheel body in FIG. 4, and FIG. 6 is a view for describing the unit cell for spoke connection forming a spoke connection part in FIG. 4.

Referring to FIG. 1, a variable-diameter wheel 1 according to the present invention is installed at a body 2 of a vehicle or a robot so that the vehicle or the robot may run on a rough road having obstacles, while changing a wheel diameter. Here, the robot or the vehicle includes all kinds of moving bodies which have the variable-diameter wheel 1 and are movably manufactured.

The variable-diameter wheel 1 according to the present invention includes a wheel 10, a spoke 40, and a variable induction shaft 50.

The wheel 10 is formed to be varied along a folding pattern into a state in which a wheel diameter is contracted, as illustrated in FIG. 2, and a state in which the wheel diameter is expanded, as illustrated in FIG. 3. The spoke 40 is coupled to both ends of the wheel 10 so as to support the both ends of the wheel 10.

As illustrated in FIG. 4, the wheel 10 is configured with a sheet having the folding pattern. FIG. 4 is the development view illustrating the state in which the wheel is separated and developed, and the wheel 10 includes a tetragonal wheel body 11 having a pattern in which a unit cell 12 is repeated, and a spoke connection part 21 formed at both longitudinal ends of the wheel body 11 so that a unit cell 22 for spoke connection is repeated. In FIG. 4, an x direction is a lengthwise direction of the wheel which determines a width of the wheel, i.e., a direction in which a driving shaft of the wheel extends, and a y direction is a circumferential direction of the wheel.

The unit cell 12 forming the wheel body 11 is a kind of origami pattern and is also so-called waterbomb pattern.

Referring to FIG. 5 illustrating the unit cell 12 of the wheel body 11, the unit cell 12 has a tetragonal shape defined by one pair of longitudinal edge folding parts 13 extending in a lengthwise direction and one pair of cross edge folding parts 14 extending in a circumferential direction, and a longitudinal middle edge folding part 15 extending in the lengthwise direction is provided at a middle portion between the longitudinal edge folding parts 13. An inclined edge folding part 16 extends at each of intersecting points A, B, C, and D of the longitudinal edge folding parts 13 and the cross edge folding parts 14 to intersect with the longitudinal middle edge folding part 15.

In the embodiment of the present invention, the inclined edge folding parts 16 intersect with each other at a center point O located at a center of the longitudinal middle edge folding part 15. The unit cell 12 is formed to be symmetrical with respect to the longitudinal middle edge folding part 15.

In the unit cell 12, the edge folding parts 13, 14, 15, and 16 form a folding area which is folded or unfolded when the diameter of the wheel 10 is varied.

Referring to FIG. 4 again, the unit cell 12 is repeated in the wheel body 11 to form the folding pattern of the wheel.

The unit cell 12 is repeated along a column extending in the circumferential direction (the y direction) of the wheel 10, and arranged to alternate with another unit cell 12 adjoining in the lengthwise direction (the x direction) formed on another column adjoining in the lengthwise direction (the x direction). At this time, the longitudinal edge folding part 13 of the unit cell 12 located on one column in the circumferential direction (the y direction) of the wheel 10 is arranged to coincide with the longitudinal middle edge folding part 15 of another unit cell 12 located on another adjacent column.

Due to such arrangement of the unit cell 12 in the wheel body 11, the diameter of the wheel 10 may be varied while the wheel 10 is folded or unfolded along each of the edge folding parts 13, 14, 15, and 16.

In a folded state, the longitudinal edge folding parts 13, the cross edge folding parts 14, and the longitudinal middle edge folding part 15 of the unit cell 12 in the wheel body 11 form hill creases which form hills higher than surroundings, and the inclined edge folding parts 16 of the unit cell 12 form valley creases which form valleys lower than surroundings.

The spoke connection part 21 is formed at the both ends in the lengthwise direction (the x direction) of the wheel body 11. The spoke connection part 21 is formed by repeatedly forming the unit cell 22 for spoke connection.

Referring to FIG. 6, the unit cell 22 for spoke connection includes a first right-angled triangular connection cell 22a in which a longitudinal peripheral edge folding part 23 extending in parallel with the longitudinal edge folding part 13 forms one side thereof, and the cross edge folding part 14 of the unit cell 12 between the intersecting point of the longitudinal edge folding part 13 and the cross edge folding part 14 and an intersecting point of the longitudinal middle edge folding part 15 and the cross edge folding part 14 forms another side thereof, and a peripheral inclined edge folding part 26 extending from the intersecting point of the longitudinal middle edge folding part 15 and the cross edge folding part 14 to an end of the longitudinal peripheral edge folding part 23 forms an oblique side thereof, and a second equilateral triangular connection cell 22b in which the peripheral inclined edge folding part 26 as the oblique side of the first right-angled triangular connection cell 22a forms one of equal sides thereof.

In one unit cell 22 for spoke connection corresponding to one unit cell 12, the first connection cell 22a and the second connection cell 22b of the unit cell 22 for spoke connection are formed to be symmetrical with respect to a line extending from the longitudinal middle edge folding part 15 of the unit cell 12 adjoining in the lengthwise direction (the x direction).

When the wheel is assembled, the second connection cell 22b of the unit cell 22 for spoke connection is in surface contact with and bonded to another second connection cell 22b of another unit cell 22 for spoke connection. Therefore, a polygonal hole for connection with the spoke 40 is formed at the both ends of the wheel 10. The first connection cell 22a serves to connect the second connection cell 22b with the wheel body 11.

According to another embodiment of the present invention, the second connection cell 22b of the unit cell 22 for spoke connection may be formed at only one side. In the embodiment illustrated in FIG. 6, since both second connection cells 22b in the unit cell 22 for spoke connection form one second connection cell 22b between both first connection cells 22a through a face-to-face coupling, when the second connection cell 22b formed at one side is coupled with the first connection cell 22a formed at the other side so as to form an edge folding part, the second connection cell 22b may be formed at only one side. And, another modification may be further provided.

Figure 7:
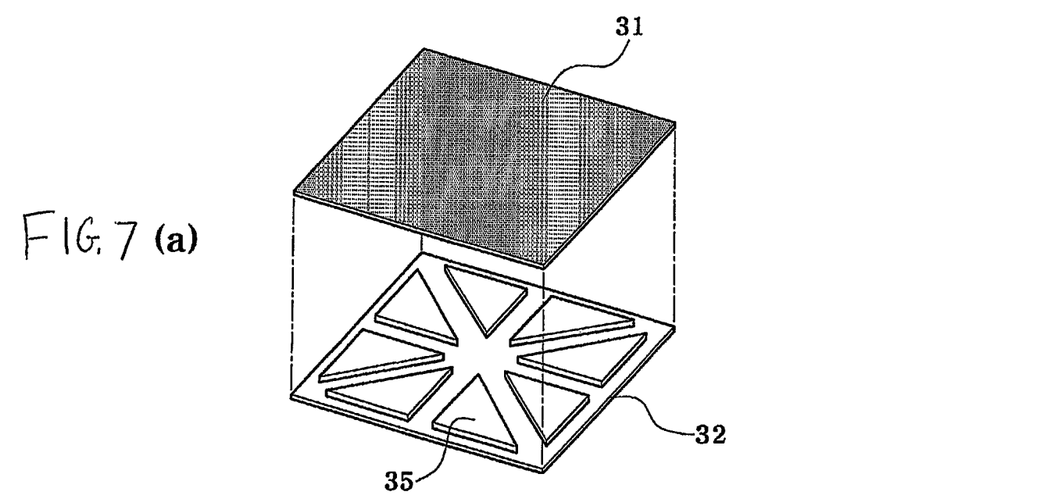

FIG. 7 is a view for describing a method of manufacturing the wheel according to present invention, wherein FIG. 7A is an exploded view, FIG. 7B is coupled view, FIG. 7C is a coupled cross-sectional view, and FIG. 7D is a view illustrating a modified example.

The sheet forming the wheel 10 includes a folding area 34 which forms the edge folding parts 13, 14, 15, 16, 23, and 26 to be foldable, and a rigid area 36 which is surrounded by the edge folding parts 13, 14, 15, 16, 23, and 26.

To this end, the wheel 10 includes a first flexible sheet 31 and a second flexible sheet 32 which are formed of a flexible material, and a rigid material 35 disposed at the rigid area 36 between the first flexible sheet 31 and the second flexible sheet 32.

The folding area 34 is formed by bonding the first flexible sheet 31 and the second flexible sheet 32 without the rigid material 35 interposed therebetween, and the rigid area 36 is formed by bonding the first flexible sheet 31 and the second flexible sheet 32 with the rigid material 35 interposed therebetween. At this time, since the rigid material 35 may be formed to be smaller than a size of the rigid area 36, the rigid area 36 is formed such that the rigid material 35 is at least partly interposed and bonded. The rigid material 35 is formed to have a smaller size than the size of the rigid area 36, such that the rigid material 35 is not provided at the rigid area 36 adjacent to the intersecting points of the edge folding parts 13, 14, 15, 16, 23, and 26, and thus the intersecting points of the edge folding parts 13, 14, 15, 16, 23, and 26 may be allowed to be more flexible. Therefore, an additional degree of freedom may be ensured at the intersecting points of the edge folding parts 13, 14, 15, 16, 23, and 26 in the rigid area 36.

In particular, to ensure the additional degree of freedom at the intersecting point in which the edge folding parts forming wheel creases intersect with each other, the size of the rigid material 35 may be changed at the rigid area 36. At this time, the size of the rigid material at one of the rigid areas separated by the edge folding parts to be opposed to each other may be formed to be small, and thus the additional degree of freedom may be ensured at the intersecting points of the edge folding parts 13, 14, 15, 16, 23, and 26. The ensuring of the additional degree of freedom at the intersecting points allows the wheel to be more smoothly folded and unfolded.

Surfaces of the first and second flexible sheets 31 and 32 facing each other may include an adhesive layer (not shown). In this case, the wheel 10 in an unfolded state may be manufactured by a simple method in which the rigid material 35 is arranged on the second flexible sheet 32 based on a designed pattern, and the first flexible sheet 31 is bonded thereon.

According to a modified embodiment illustrated in FIG. 7D, a through-hole 37 may be formed at the intersecting point in the folding area 34, in which the edge folding parts intersect with each other. The through-hole 37 serves to relieve a stress concentrated on the intersecting point of the edge folding parts. Further, a reinforcing member 38 formed of the rigid material may be coupled into the through-hole 37 depending on embodiments.

Since the intersecting point in the variable-diameter wheel 1 according to the present invention is a portion which is in contact with the ground, the portion of the wheel 10 which is in contact with the ground may be reinforced by the reinforcing member 38.

The embodiment illustrated in FIG. 7 describes a method of manufacturing the sheet forming the wheel 10 using the flexible sheets 31 and 32 and the rigid material 35. However, the wheel manufacturing method according to the present invention is not limited to the manufacturing method illustrated in FIG. 7. For example, a hinge connection part may be formed at each side of the rigid material formed of a metal plate, and then the rigid materials may be connected with each other, and thus the sheet having the folding pattern illustrated in FIG. 4 may be formed.

Further, a cover formed of a rubber material or the like may be formed on an outer surface of the wheel 10 to reinforce the wheel 10.

Figure 8:
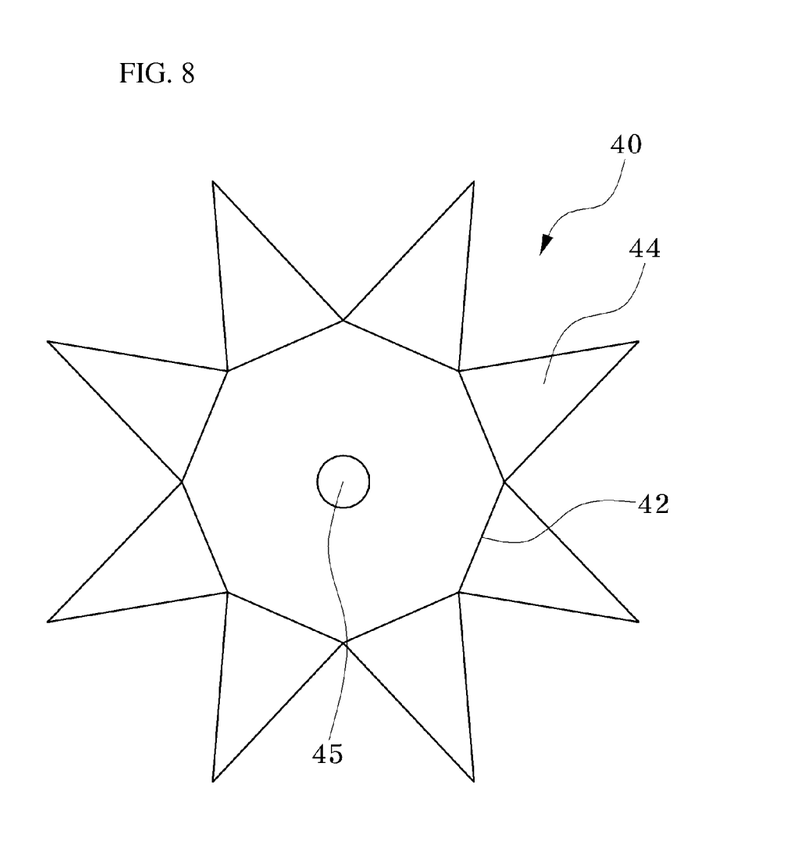
FIG. 8 is a view illustrating a spoke according to an embodiment of the present invention.

FIG. 8 is a view illustrating the spoke according to an embodiment of the present invention.

In the wheel having a sheet state illustrated in FIG. 4, when circumferential ends of the wheel body 11 are connected with each other, and the second connection cells 22b of the respective unit cells 22 for spoke connection are face-to-face coupled, the polygonal hole is formed at the both ends of the wheel 10. The spoke 40 has a polygonal edge 42 corresponding to the polygonal hole formed at the both ends of the wheel 10.

The spoke may have a connection piece 44 extending outward from the polygonal edge 42 to be connected with the wheel 10. The connection piece 44 may be formed to correspond to the second connection cell 22b, and thus may be coupled with the second connection cell 22b, thereby being coupled to the both ends of the wheel 10.

The spoke 40 serves to support the wheel 10 by being coupled to the both ends of the wheel 10 and to dimensionally fix the both ends of the wheel 10. Therefore, when a distance between the both spokes 40 is varied in a lengthwise direction thereof, a portion between the both ends of the wheel 10 is also varied, and the diameter of the wheel is changed. That is, as the both spokes 40 are moved to be closer to or farther from each other in the lengthwise direction, the wheel 10 may be deformed so that the wheel diameter is expanded (referring to FIG. 3), while a center portion thereof is inflated, or the wheel diameter is contracted (referring to FIG. 2), while deformed in a cylindrical shape.

A shaft hole 45 is formed at a center of the spoke 40 to be coupled with the variable induction shaft 50.

Figure 9:
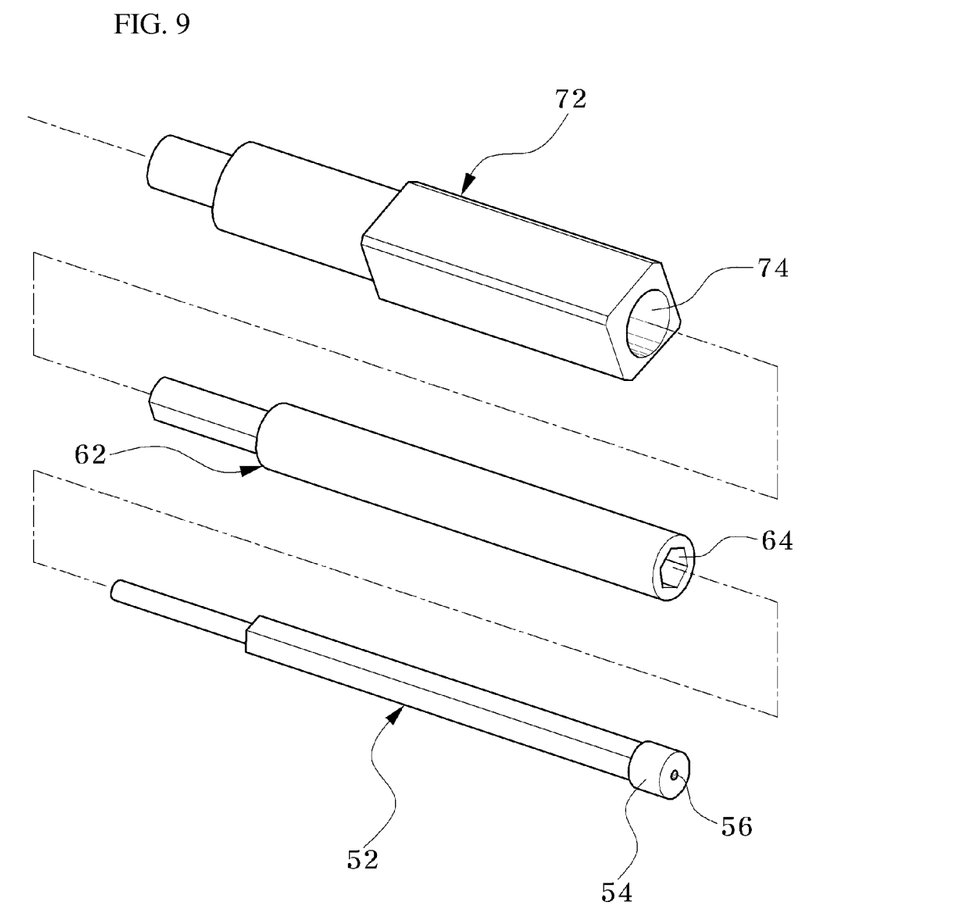
FIG. 9 is a view illustrating a component of a variable induction shaft according to an embodiment of the present invention.
Figure 10:
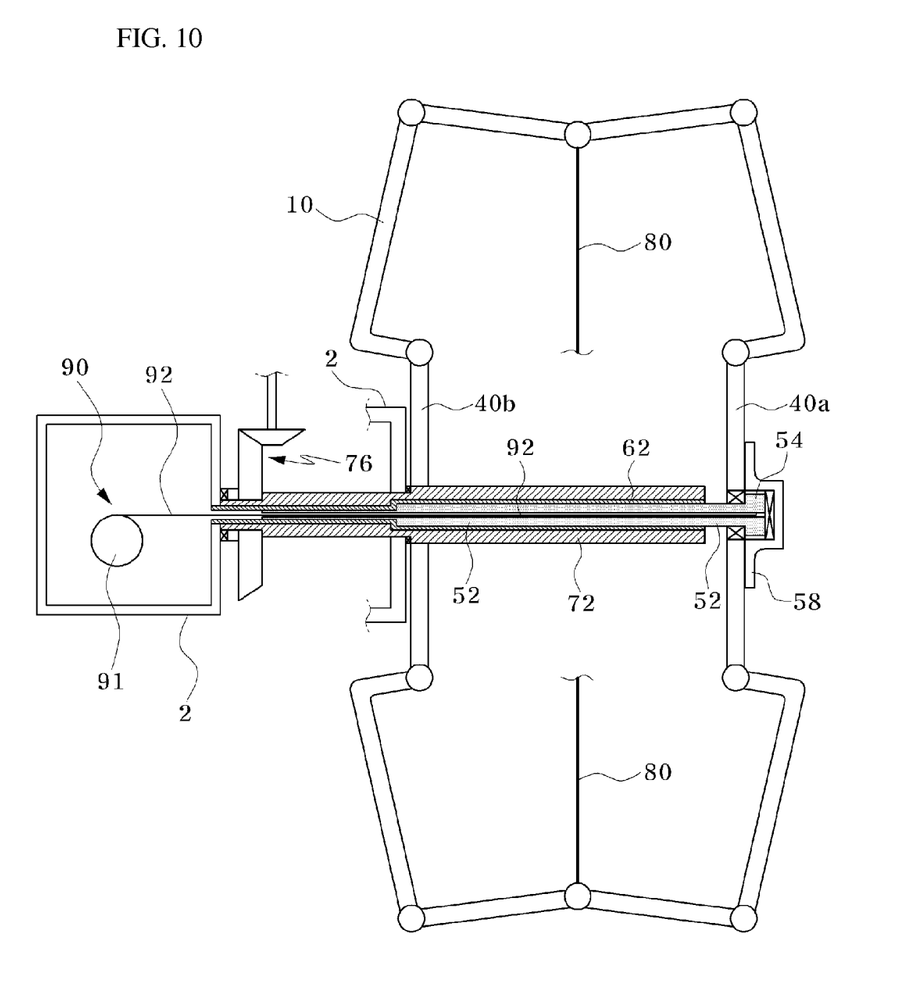
FIG. 10 is a coupled cross-sectional view of the variable induction shaft according to the embodiment of the present invention, which illustrates a state in which the wheel diameter is reduced.
Figure 11:
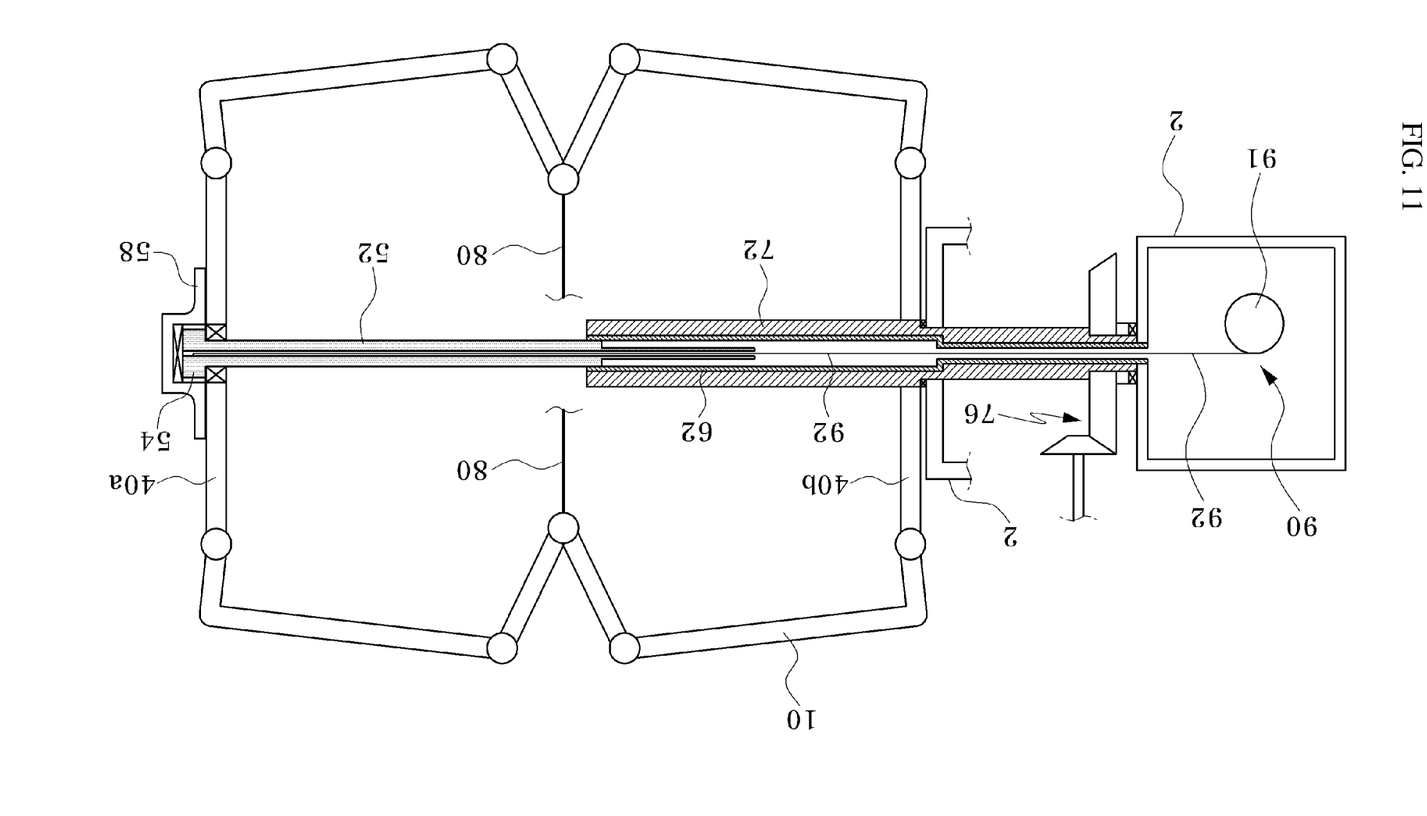
FIG. 11 is a coupled cross-sectional view of the variable induction shaft according to the embodiment of the present invention, which illustrates a state in which the wheel diameter is increased.

FIG. 9 is a view illustrating a component of the variable induction shaft according to an embodiment of the present invention, and FIGS. 10 and 11 are coupled cross-sectional views of the variable induction shaft, wherein FIG. 10 illustrates a state in which the wheel diameter is reduced, and FIG. 11 illustrates a state in which the wheel diameter is increased.

According to the embodiment of the present invention, the variable induction shaft 50 includes a sliding shaft 52, a fixing shaft 62, and a rotating shaft 72.

The sliding shaft 52 is inserted into a hollow 64 of the fixing shaft 62 to be movable in a lengthwise direction thereof, and one end thereof is coupled with one spoke 40a located at a distant side from the body 2 of the robot.

The one spoke 40a is rotatably coupled with the sliding shaft 52 so as not to be restrained by the sliding shaft 52. One end of the sliding shaft 52 extends through a shaft hole of the one spoke 40a, and a bearing may be interposed between the shaft hole and the sliding shaft 52 so that rotation of the one spoke 40a is not restrained. Due to such a coupling, even when the one spoke 40a is rotated with the wheel 10, a rotating force is not transmitted to the sliding shaft 52.

The sliding shaft 52 is coupled with the one spoke 40a to control movement of the one spoke 40a in the lengthwise direction.

In the embodiment, the sliding shaft 52 has a flange 54 formed at one end thereof to be radially expanded. The flange 54 is in contact with an outer surface around the shaft hole of the one spoke 40a.

Therefore, when the sliding shaft 52 is pulled toward the other spoke 40b adjacent to the body 2 of the robot, the one spoke 40a is pulled toward the other spoke 40b. Therefore, the wheel 10 is deformed so that the wheel diameter is expanded.

In the embodiment, when the sliding shaft 52 is moved in a direction which is farther from the other spoke 40b, the wheel 10 is deformed by an elastic member 80 in a direction in which the wheel diameter is contracted, and thus the one spoke 40a is moved with one end of the sliding shaft 52.

That is, since the elastic member 80 which controls the wheel diameter in a direction in which the wheel diameter is contracted is installed at the wheel 10, the wheel 10 is deformed by the elastic member 80 in the direction in which the wheel diameter is contracted, i.e., a length (width) thereof is increased, when the sliding shaft 52 is moved in a direction in which one end thereof is farther from the other spoke 40b, and also the one spoke 40a is moved with one end of the sliding shaft 52 to be farther from the other spoke 40b. A range of the movement of the one spoke 40a is controlled by the flange 54 formed at one end of the sliding shaft 52.

In the embodiment, the sliding shaft 52 has a hollow 56 through with a wire 92 passes, and the wire 92 extends through the hollow 56 and is coupled with one end of the sliding shaft 52. Therefore, when the wire 92 is pulled toward the other spoke 40b, the one spoke 40a is moved. In the case in which the wire 92 is formed of a flexible material, when the wire 92 is released, a force of the wire 92 which restrains the one spoke 40a is removed, and thus the one spoke 40a is moved in one direction by a restoring force of the elastic member 80 applied to the wheel 10. In the case in which the wire 92 has rigidity, the one spoke 40a is moved by a force by which the one spoke 40a is pushed in the one direction and the restoring force applied to the wheel 10 by the elastic member 80, while the wire 92 is released. A length in which the sliding shaft 52 is moved in the one direction is determined by a released length of the wire 92.

According to the embodiment of the present invention, a sliding shaft cover 58 which at least partly covers the flange and is coupled with the one spoke 40a may be further provided at an outer side of the one spoke 40a.

The sliding shaft cover 58 maintains the flange 54 of the sliding shaft 52 between an outer circumferential surface of the one spoke 40a and an inner side of the sliding shaft cover 58, and controls the one spoke 40a to be moved in one direction and the other direction, as the sliding shaft 52 is moved.

The fixing shaft 62 has the hollow 64 in which the sliding shaft 52 is coupled so as to be rotatable and movable in the lengthwise direction. Further, the fixing shaft 62 is inserted into a hollow 74 of the rotating shaft 72.

The other end of the fixing shaft 62 is fixed to the body 2 of the robot.

The fixing shaft 62 serves as a guide member which guides movement of the sliding shaft 52 in an axial direction, i.e., in the lengthwise direction, and also serves to fix the wheel 10 to the body 2 of the robot.

The rotating shaft 72 has the hollow 74 in which the fixing shaft 62 is inserted and coupled. The rotating shaft 72 is rotatably coupled with the fixing shaft 62. Therefore, while the fixing shaft 62 is fixed to the body 2 of the robot, the rotating shaft 72 may not be restrained by the fixing shaft 62 and may be rotated.

The rotating shaft 72 is restrictively coupled so as to be rotated with the other spoke 40b. Therefore, when the rotating shaft 72 is rotated, the other spoke 40b is rotated, and thus the wheel 10 is rotated.

A power transmitting part 76 which receives a rotating force provided from the body 2 of the robot is provided at the other end of the rotating shaft 72. In the embodiment, a bevel gear is provided at an outer circumferential surface of the other end of the rotating shaft 72 to receive a rotating force transmitted from a power source (not shown) in the body 2 of the robot, such that the rotating shaft 72 is rotated.

According to the present invention, a sliding shaft actuator 90 is installed to control axial movement of the sliding shaft 52. In the embodiment, the sliding shaft actuator 90 includes a driving motor 91 which is installed at the body 2 of the robot, and the wire 92 which connects the driving motor 91 with the sliding shaft 52.

Therefore, when the driving motor 91 is rotated in a direction in which the wire 92 is wound, the sliding shaft 52 is pulled, and thus the one spoke 40a is pulled toward the other spoke 40b. At this time, the wheel 10 is deformed so that the wheel diameter is expanded.

When the driving motor 91 is rotated in a direction in which the wire 92 is unwound, a force by which the sliding shaft 52 and the one spoke 40a connected with the sliding shaft 52 are restrained is removed, and the wheel 10 is deformed so that the diameter is contracted, and thus the one spoke 40a is moved to be farther from the other spoke 40b. At this time, the sliding shaft 52 is moved with the one spoke 40a by the flange 54.

In a modified embodiment of the present invention, the sliding shaft actuator 90 may be a pneumatic or hydraulic cylinder. Therefore, when the cylinder is expanded in a direction in which a length thereof extends, the one spoke 40a may be farther from the other spoke 40b, and when the length of the cylinder is reduced, the one spoke 40a may be closer to the other spoke 40b.

According to the embodiment of the present invention, the elastic member 80 which assists with the deformation of the wheel 10 is installed at the wheel 10. The elastic member 80 is installed in the wheel 10 to apply a force in a direction in which the wheel diameter is reduced. Therefore, when the one spoke 40a is farther from the other spoke 40b, the wheel is deformed in the cylindrical shape by the restoring force of the elastic member 80 so that the wheel diameter is reduced.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A variable-diameter wheel comprising:
    a wheel having a folding pattern in which a unit cell is repeated and configured to be expanded or contracted so that a wheel diameter is varied;
    two spokes fixedly coupled respectively to both longitudinal ends of the wheel and configured to allow a distance between the two spokes to be changed for the wheel to be expanded or contracted, such that the wheel diameter is varied; and
    a variable induction shaft rotatably coupled with one of the two spokes to move the one of the two spokes in at least one lengthwise direction and configured to vary a distance between the two spokes.

2. The variable-diameter wheel of claim 1, wherein the unit cell of the wheel comprises one pair of longitudinal edge folding parts configured to extend in a lengthwise direction of the wheel, one pair of cross edge folding parts configured to extend in a circumferential direction of the wheel, a longitudinal middle edge folding part configured to extend in the lengthwise direction at a middle portion between the longitudinal edge folding parts, and an inclined edge folding part configured to extend at each intersecting point of the longitudinal edge folding parts and the cross edge folding parts to be inclined and to intersect with the longitudinal middle edge folding part.

3. The variable-diameter wheel of claim 2, wherein the wheel comprises a wheel body having the folding pattern in which the unit cell is repeated, and spoke connection parts formed respectively at both longitudinal ends of the wheel body and in which a unit cell for spoke connection is repeated so as to form a predetermined-sized spoke coupling hole at the both longitudinal ends of the wheel body, and
    wherein the unit cell for spoke connection comprises a first connection cell in which a longitudinal peripheral edge folding part configured to extend in parallel with the longitudinal edge folding part of the unit cell located at the both ends of the wheel body forms one side thereof, and a peripheral inclined edge folding part configured to extend from an end of the longitudinal peripheral edge folding part to an intersecting point of the longitudinal middle edge folding part and the cross edge folding part of the unit cell is provided, and a second connection cell formed to be connected with at least one peripheral inclined edge folding part of both first connection cells, such that the both first connection cells are connected with each other via an equilateral triangular cell.

4. The variable-diameter wheel of claim 1, wherein the variable induction shaft comprises a sliding shaft coupled with the one of the two spokes to be rotatable and to control movement of the one of the two spokes in at least one lengthwise direction, a sliding shaft actuator configured to provide a longitudinal movement force of the sliding shaft, and a rotating shaft restrictively coupled with the other of the two spokes to rotate the other of the two spokes.

5. The variable-diameter wheel of claim 4, wherein the variable induction shaft further comprises a fixing shaft having a hollow in which the sliding shaft is coupled to rotatable therein and which guides longitudinal movement of the sliding shaft, and of which the other end is fixed to a body of a robot or a vehicle,
    the sliding shaft extends through the hollow of the fixing shaft so that one end thereof is coupled to the one of the two spokes, and
    the rotating shaft has a hollow in which the fixing shaft is inserted, and the rotating shaft is coupled so as to be rotatable with respect to the fixing shaft, and a power transmitting part configured to receive a rotating force provided from a power source of the robot or the vehicle is provided at the other end of the rotating shaft.

6. The variable-diameter wheel of claim 5, wherein the sliding shaft extends to pass through a shaft hole of the one of the two spokes, and a flange at least partly expanded in a radial direction is provided at an end of the sliding shaft located at an outer side of the shaft hole.

7. The variable-diameter wheel of claim 6, further comprising a sliding shaft cover configured to cover the flange of the sliding shaft located at an outer side of the one of the two spokes, and coupled with the one of the two spokes.

8. The variable-diameter wheel of claim 4, wherein the sliding shaft actuator comprises a driving motor installed at a body of the vehicle or the robot, and a wire wound on or unwound from the driving motor and of which an end is fixed to the sliding shaft.

9. The variable-diameter wheel of claim 1, wherein an elastic member configured to provide an elastic force in a direction in which the wheel is contracted is installed in the wheel.

10. The variable-diameter wheel of claim 1, wherein a sheet including a folding area configured to form edge folding parts which are foldable when the wheel is separated and developed, and a rigid area surrounded by the folding area is formed, and the wheel includes first and second flexible sheets formed of a flexible material, and a rigid material disposed at a position of the rigid area between the first and second flexible sheets, and the folding area is formed by bonding the first and second flexible sheets without the rigid material interposed therebetween, and the rigid area is formed by bonding the first and second flexible sheets with the rigid material at least partly interposed therebetween.

11. The variable-diameter wheel of claim 10, wherein a through-hole is formed at an intersecting point of the edge folding parts, and a reinforcing member is coupled in the through-hole.

* * * * *